United States Patent [19]

Shane

[11] Patent Number: 5,793,972
[45] Date of Patent: Aug. 11, 1998

[54] SYSTEM AND METHOD PROVIDING AN INTERACTIVE RESPONSE TO DIRECT MAIL BY CREATING PERSONALIZED WEB PAGE BASED ON URL PROVIDED ON MAIL PIECE

[75] Inventor: Terence Martin Shane, North York, Canada

[73] Assignee: Westminster International Computers Inc., Richmond Hill

[21] Appl. No.: 642,317

[22] Filed: May 3, 1996

[51] Int. Cl.[6] .................................................. G06F 15/16
[52] U.S. Cl. ........................ 395/200.49; 705/14; 705/26
[58] Field of Search ................. 705/14, 26; 395/200.47, 395/200.49, 186, 187.01, 188.01; 707/501, 507; 345/333, 335

[56] References Cited

U.S. PATENT DOCUMENTS 5,495,565  2/1996  Millard et al. ............................ 707/507
5,502,636  3/1996  Clarke ...................................... 705/14

OTHER PUBLICATIONS

Ken Goldberg et al. The Mercury Project "Beyond the Web: Excavating the Real World Via Mosiac" 1994: n. pag. Online. Internet. Available: http://www.usc.edu/dept/raiders/paper/.

*Primary Examiner*—Dong C. Dinh
*Attorney, Agent, or Firm*—Bereskin & Parr

[57] ABSTRACT

A system for providing an interactive response to direct mail programs comprises a recipient database, a mail generator, and a web server computer operationally connected through the Internet to remote computers accessible by direct mail recipients. The recipient database stores data records containing addressing information such as the name, mail, fax or e-mail address, and a unique personal identification code for each direct mail recipient. The mail generator retrieves recipient data from the database and generates a multiplicity of direct mail pieces each displaying the name, address, and a uniform resource locator containing the personal identification code for one recipient. A responding recipient accesses the web server computer by entering the uniform resource locator displayed on the direct mail piece into a web browser on a remote computer. The web server computer retrieves recipient data from the recipient database correlated to the personal identification code contained in the uniform resource locator and uses this recipient data to create a unique interactive web page.

26 Claims, 8 Drawing Sheets

SYSTEM AND METHOD PROVIDING AN INTERACTIVE RESPONSE TO DIRECT MAIL BY CREATING PERSONALIZED WEB PAGE BASED ON URL PROVIDED ON MAIL PIECE

FIELD OF THE INVENTION

This invention relates to the field of direct marketing, and in particular, to direct mail advertising.

BACKGROUND OF THE INVENTION

The recent explosion in the popularity of the Internet has provided tremendous potential for marketing goods and services. However, for most small to mid-sized companies, advertising their wares and services through a web-site on the Internet has not proven to be very effective. One of the difficulties with advertising on the Internet is directing consumers to visit a particular web-site. The overabundance of web-site locations has created an information overload for many consumers. Much of the content available on the Internet is too generalized. As a result, consumers are often required to spend hours querying search engines to locate relevant information, often with limited success. Furthermore, even when consumers access a particular web-site, the web-site provider is unable to obtain any useful specific information about the consumer other than the Internet protocol (IP) address of the consumer's computer, unless the consumer fills in and submits electronic forms provided by the web-site.

Electronic mail ("e-mail") is one possible solution for advertisers. Despite its allure, however, promotional e-mail is still frowned upon, and at present its content is generally limited to unformatted text without graphics. The sender is not even able to determine the font of the e-mail message. Additionally, targeted e-mail lists are not yet available for advertisers.

At present, a significant amount of advertising is conducted through direct mail. Some of the benefits of direct mail are that it is highly targeted, generally accepted or even welcomed, it provides tremendous creative flexibility for the advertiser, and it has a proven record of generating results.

Direct mail advertising typically involves the rental of one or more direct mailing lists from a list broker. Usually, lists are made available for one-time use only. Further mailings to the same list or lists of individuals are prohibited without additional payments. In order to ensure that the names purchased are in fact only used once, the list is usually provided to a third party direct mail service bureau (also referred to as a data house or a data processing service bureau) which processes the data. Although the direct mail service bureau sometimes prints and addresses the direct mail pieces, and prepares them for mailing or delivery, often these steps are performed by a separate organization referred to as a letter shop. Names and addresses of individuals who respond to the direct mailing are considered to be the non-exclusive property of the list renter, and can be used repeatedly without further payment obligations. Phone calls, orders, and responding mail are considered to be acceptable responses, thereby triggering title of the correlated data to become the non-exclusive property of the list renter. Sometimes, the direct mail service bureau will also provide a telephone answering service for the list renter. Under standard arrangements, the direct mail service bureau is permitted to release to the list renter the names and addresses of those individuals who respond to the direct mail advertisement by calling the answering service.

However, conventional direct mail has certain limitations. A one percent (1%) response rate is considered a success, while a five to ten percent (5–10%) response rate is exceptional. Therefore, ninety to ninety-nine percent (90–99%) of the direct mailing never generates a response. The largest single cost component of any campaign, other than postage, is often list rental. If only a small percentage of recipients respond to a direct mailing, the advertiser will have no right to re-mail the bulk of the individuals on the list without paying additional list rental fees. Direct mail also lacks the instant gratification and feedback of on-line interactivity.

While the Internet is capable of providing instant, interactive information, it has not historically been able to provide the personalized one-to-one communication provided by direct mail, unless an individual identifies himself or herself during interaction with an advertiser's web page.

There is accordingly a need for methods and apparatus which make it easier and more attractive for recipients to respond to direct mail.

SUMMARY OF THE INVENTION

The present invention is directed towards a system for providing an interactive response to direct marketing programs, which involve the creation of a personalized computer web page or like computer user interface accessible by each recipient of the direct mail.

In one aspect, the invention comprises a system for creating a personalized computer user interface for a communications network, such as the Internet, comprising a recipient database which stores a plurality of recipient data records containing recipient addressing information and a unique personal identification code for each of the recipients, means for providing each of the recipients with an electronic return address, such as a uniform (universal) resource locator ("URL"), containing the unique personal identification code, and a computer server means for serving a plurality of remote computers operationally coupled to the communications network. The computer server means includes access means for providing a recipient with access to the web server computer by entering the electronic return address provided to the recipient into a web browser on a remote computer. Retrieval means operationally coupled to the computer server means then retrieves recipient data from the recipient database correlated to the personal identification code contained in the electronic return address. User interface creation means coupled to the computer server means and the recipient database then uses this recipient data to create a unique interactive web page and communicate it to the remote computer.

In another aspect, the invention comprises a system for providing an interactive response to a direct mail marketing program. A database stores recipient data records containing the name, recipient address, and unique personal identification code for each of the recipients. A mail generator retrieves recipient data from the database and generates a multiplicity of direct mail pieces each displaying the name, address, and a uniform resource locator containing the personal identification code for one recipient. A web server computer accessible through the Internet and capable of serving a plurality of web browsers enables a responding recipient to access the web server computer by entering the uniform resource locator displayed on the direct mail piece received by the responding recipient into a web browser on a remote computer. The web server computer retrieves recipient data from the recipient database correlated to the personal identification code contained in the uniform resource locator and uses this recipient data to create a unique interactive web page, and download the web page to responding recipient's web browser.

In a preferred embodiment, the system also generates a respondent database containing the recipient data record for each responding recipient. The system also preferably is capable of detecting unauthorized attempts to generate personalized web pages by detecting an invalid personal identification code which does not match any of the personal identification codes stored in the recipient database.

The present invention is also directed toward a method for increasing response to direct marketing, comprising the steps of:

(a) creating a recipient database containing a plurality of recipient data records each comprising a name, an address and a unique personal identification code;

(b) providing each of a plurality of recipients with a uniform resource locator containing one of the unique personal identification codes;

(c) providing an Internet communication link between a web server computer and a plurality of remote computers having web browsers accessible by recipients;

(d) receiving the uniform resource locator entered by a responding recipient into the web browser of a remote computer;

(e) extracting the personal identification code contained in the uniform resource locator;

(f) retrieving recipient data from the recipient database correlated to the personal identification code; and (g) generating a personalized web page based on the recipient data accessible by the web browser of the responding recipient.

BRIEF DESCRIPTION OF THE DRAWINGS

The present invention will now be described, by way of example only, with reference to the following drawings, in which like reference numerals refer to like parts and in which.

DETAILED DESCRIPTION OF THE PREFERRED EMBODIMENT

Figure 1:
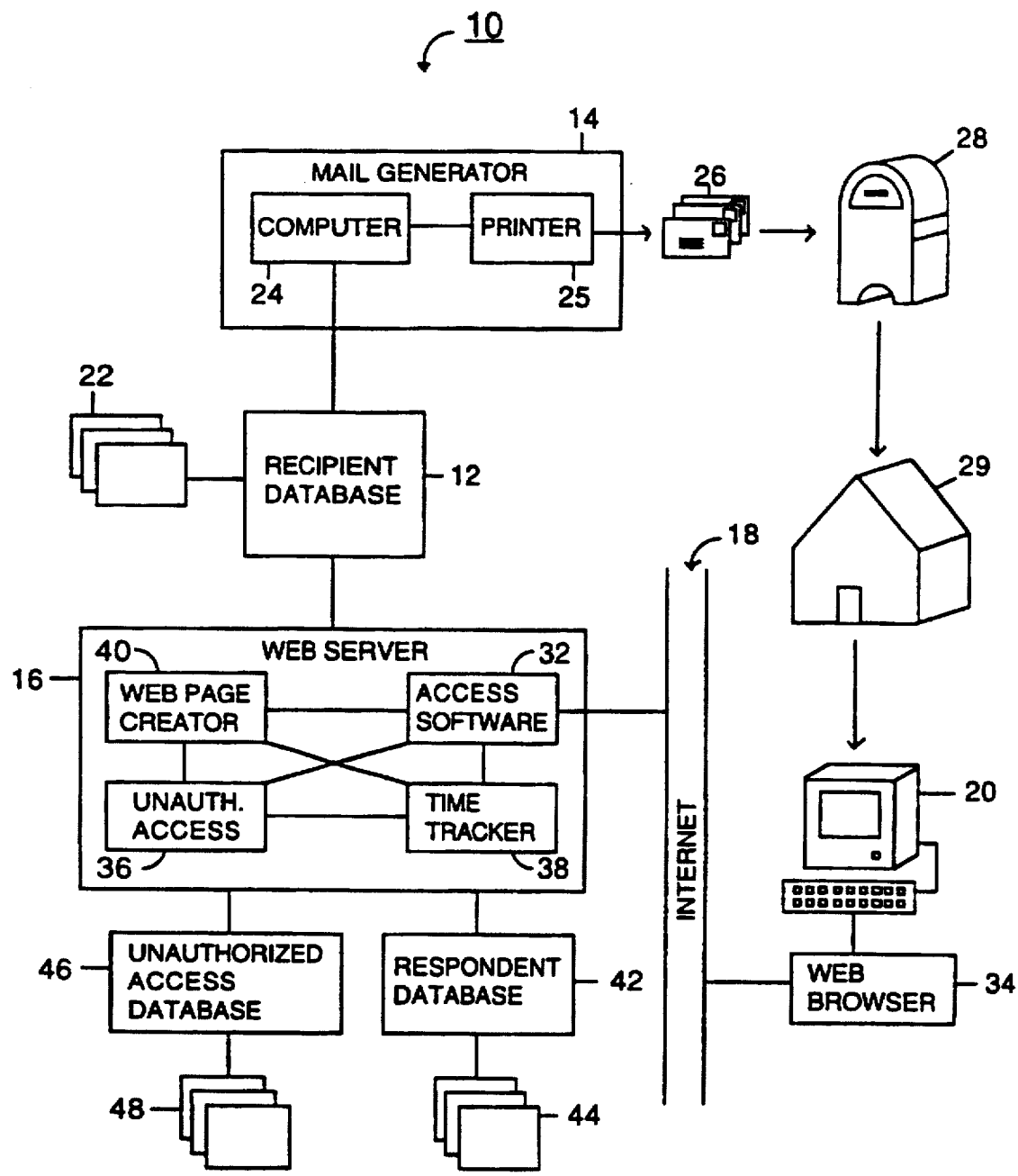
FIG. 1 is a schematic diagram of the components of the subject invention.

Referring to FIG. 1, illustrated therein is an interactive direct mail response system shown generally as 10 made in accordance with a preferred embodiment of the subject invention. Interactive direct mail response system 10 comprises a recipient database 12, mail generator 14, and web server computer 16 operationally connected through the Internet 18 to a remote computer 20 accessible by a recipient of direct mail.

Recipient database 12 stores recipient data records 22 containing recipient addressing information, such as the recipient's name and address and a unique personal identification code for each intended direct mail recipient. Typically the recipient data contained in the recipient data records 22 is obtained from a mailing list broker and entered into the recipient database 12. The recipient database 12 may also include demographic and tracking information for each recipient.

Mail generator 14, typically located in a lettershop, is electronically coupled to recipient database 12 so as to be capable of retrieving the recipient data for each intended direct mail recipient. Preferably, mail generator 14 comprises a computer system 24 including a printer 25 for printing direct mail pieces 26 displaying thereon the name, address and uniform resource locator containing a unique personal identification code, for each intended recipient. (A uniform resource locator defines an electronic path to a resource, such as a file, program, directory, or web-site, on the Internet.) Mail generator 14 also typically addresses and prepares direct mail pieces 26 for mailing through a postal system 28, which delivers mail pieces 26 to a plurality of locations 29, typically the home or office of each recipient.

Web server computer 16 is electronically coupled to recipient database 12 to enable web server computer 16 to retrieve the recipient data for each direct mail recipient. Web server computer 16 is also operationally connected to the Internet 18 or an equivalent communications network and comprises access software 32 for enabling remote computer 20 as operated by a direct mail recipient at location 29 to access the web server computer 16. Every computer accessing the Internet possesses a unique Internet protocol address which identifies the computer and indicates the electronic pathway by which a computer has gained access to the Internet. Access software 32 determines the Internet protocol address of the remote computer 20.

Web browser 34, typically in the form of software resident on remote computer 20, enables responding recipient at location 29 to communicate with web server computer 16 through the Internet 18. Responding recipient enters the uniform resource locator containing the unique personal identification code displayed on the direct mail piece 26 received by the responding recipient, into the web browser 34. Unauthorized access detector 36 determines whether the personal identification code matches one of the personal identification codes stored in the recipient database 12. Time tracker 38 determines the time at which an attempt is made to access the web server computer 16. Web page creator 40 generates a personalized web page based on data correlated to the personal identification code of the responding recipient. Typically web page creator 40 will access a predeveloped and stored web page and merge it with data retrieved from the recipient database 12.

Web server computer 16 also includes means for generating a respondent database 42 containing respondent data records 44 which duplicate the data stored in the recipient data records 22 for each responding recipient. Preferably, the respondent data records 44 will also contain data correlated to the number of visits the responding recipient has made to the web page, as well as the time of each visit. Additionally, web server computer 16 preferably includes means for generating an unauthorized access attempts database 46 which stores unauthorized access attempts data records 48 correlated to the Internet protocol address of each remote computer 20 which has entered a non-matching, and therefore invalid, personal identification code, in addition to the number of, and time of each access attempt in which an invalid personal identification code was contained within an entered uniform resource locator.

Figure 2:
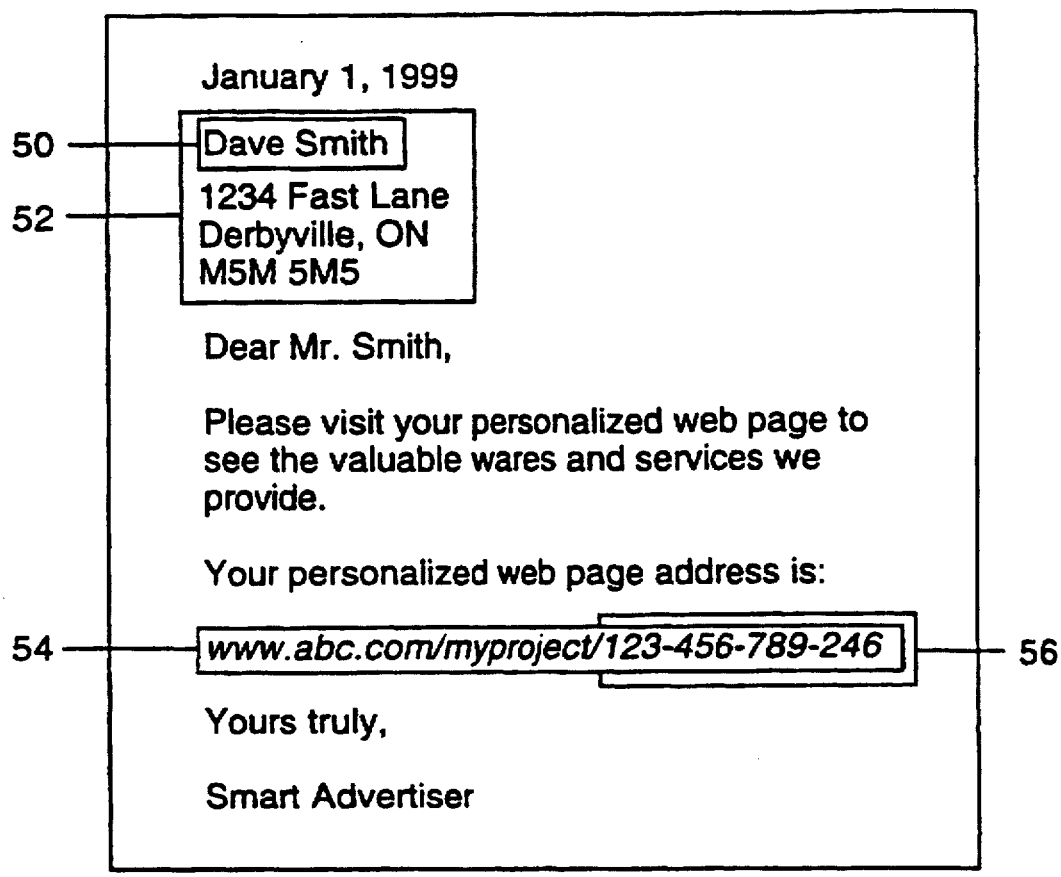
FIG. 2 is an overhead view of one possible example of a direct mail piece generated in accordance with the subject invention.

As shown in FIG. 2, direct mail piece 26 displays information correlated to the data of one data record 22 stored in recipient database 12. The recipient's name 50 and address 52 are displayed, as is the uniform resource locator 54, of which the last series of characters comprises the unique personal identification code 56. It is this uniform resource locator 54 which is entered by the responding recipient into web browser 34 to access the web server computer 16 which generates a personalized web page (as shown in FIG. 3).

Figure 3:
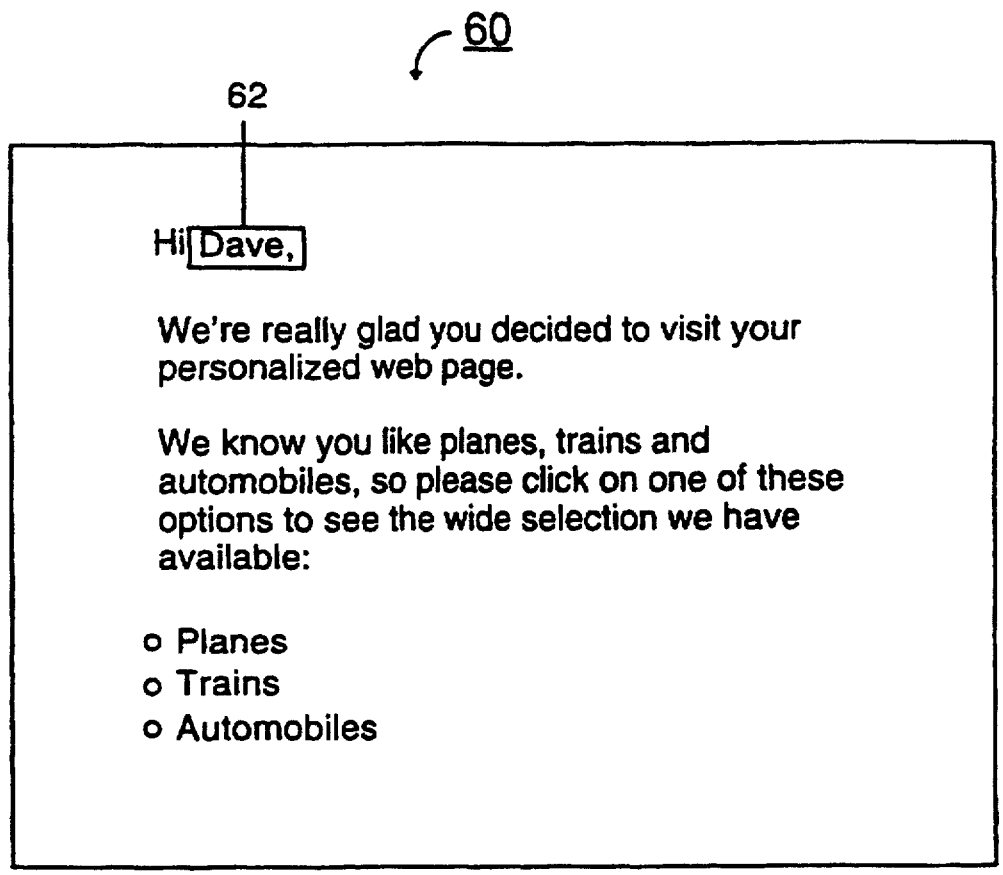
FIG. 3 is an overhead view of one possible example of a personalized web page generated in accordance with the subject invention, and correlated to the direct mail piece shown in FIG. 2.
Figure 4A:
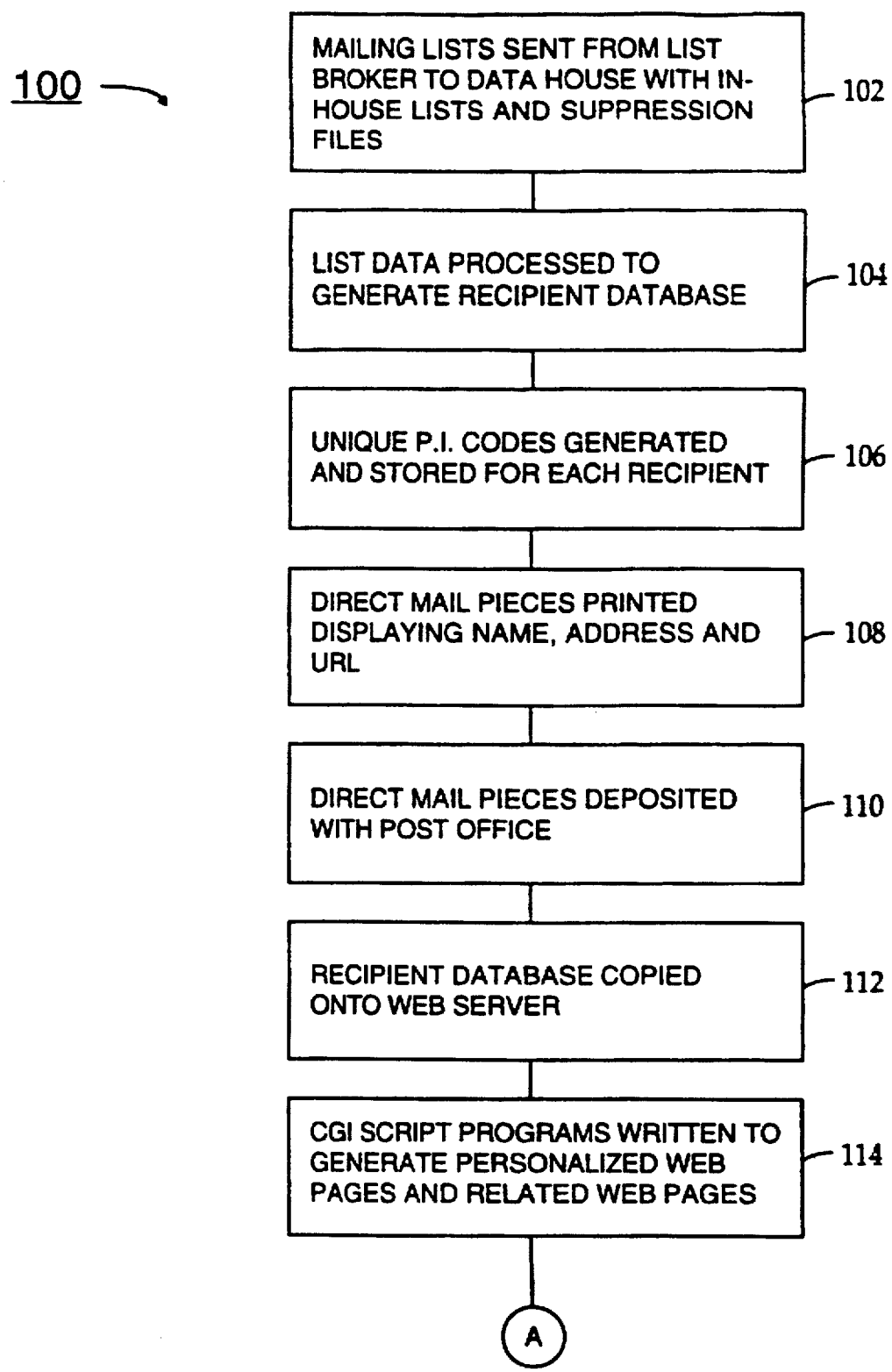
FIGS. 4A–4E together comprise a flow chart showing the method used by the subject apparatus to generate pieces of direct mail and correlated personalized web pages.
Figure 4B:
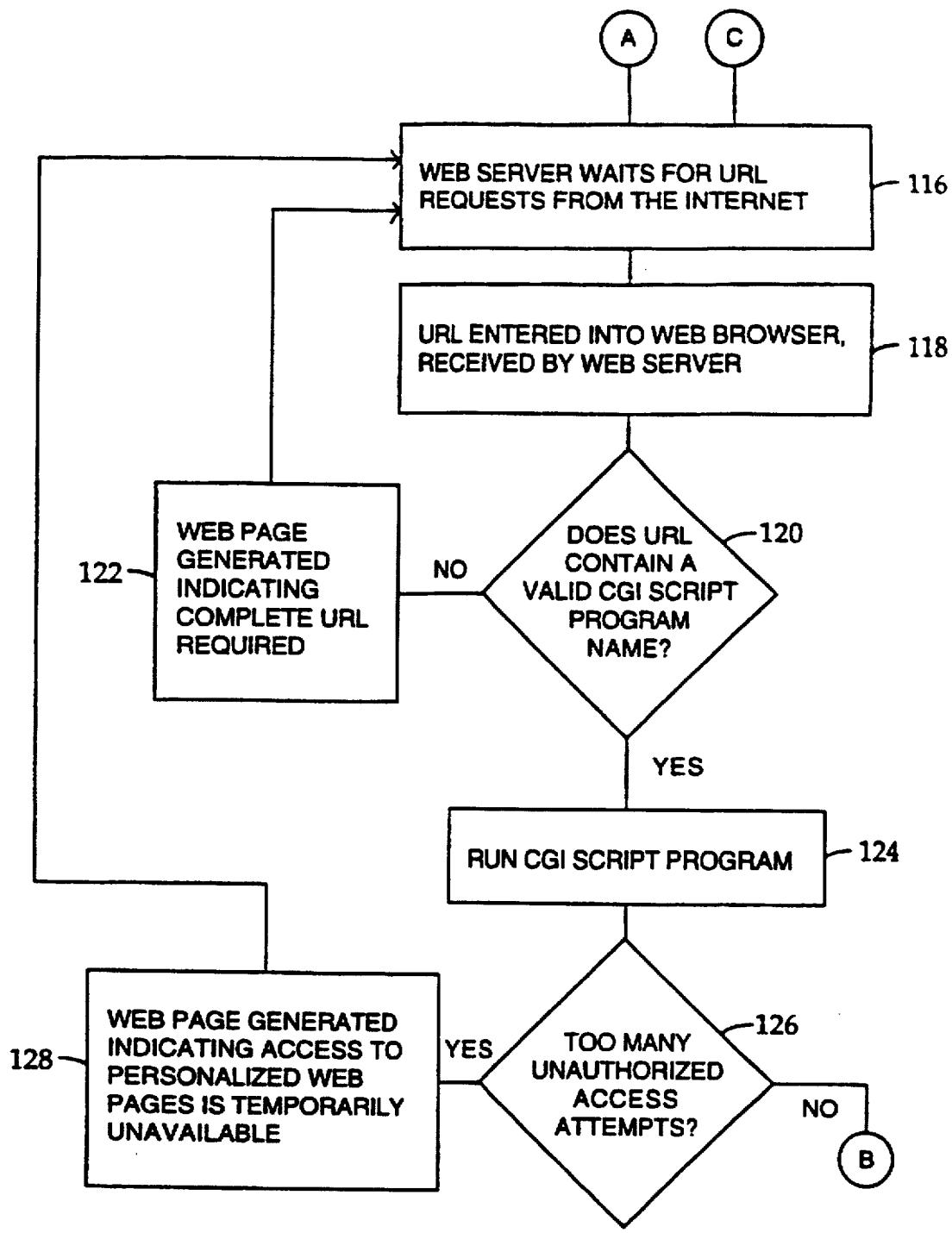
Figure 4C:
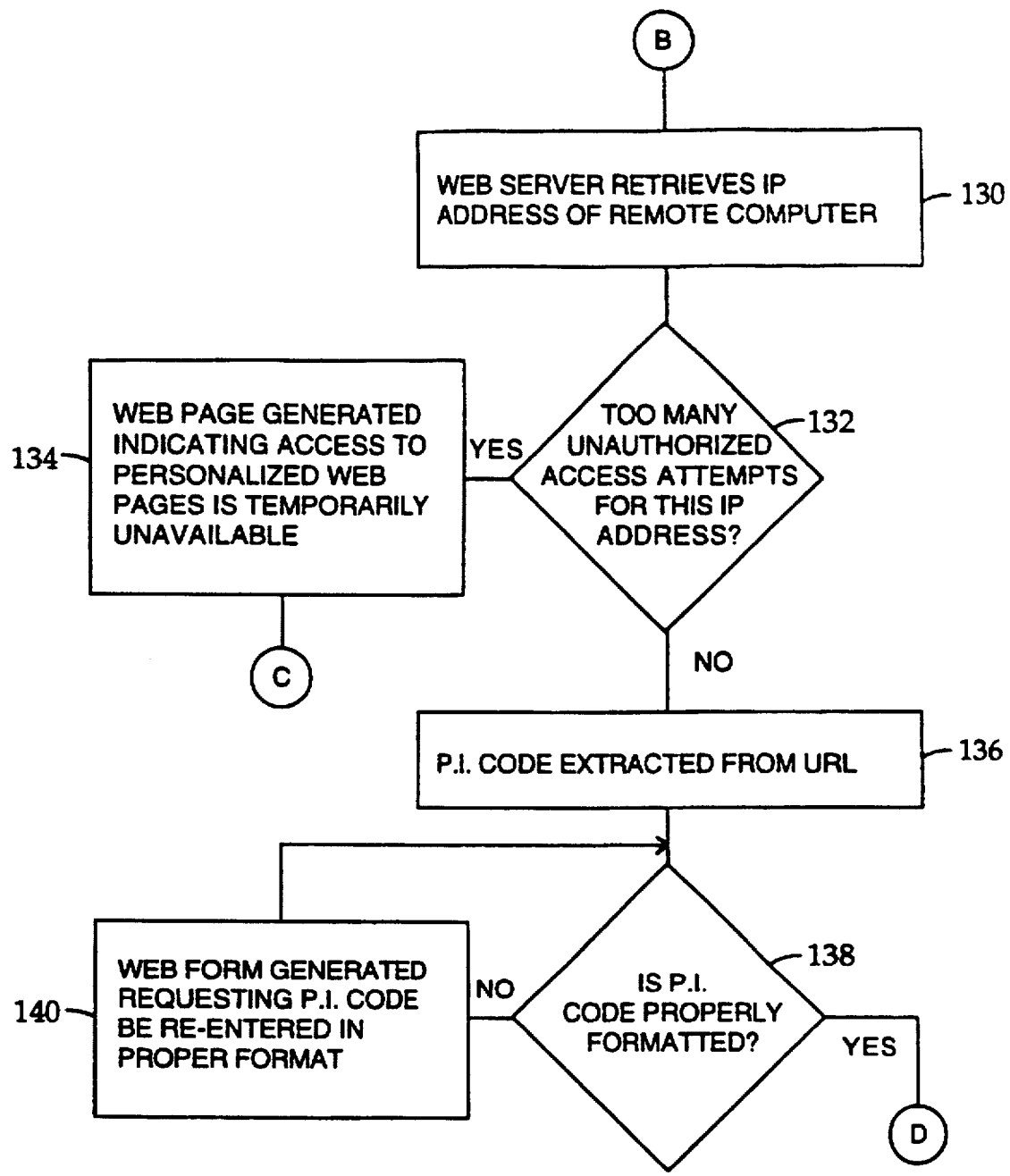
Figure 4D:
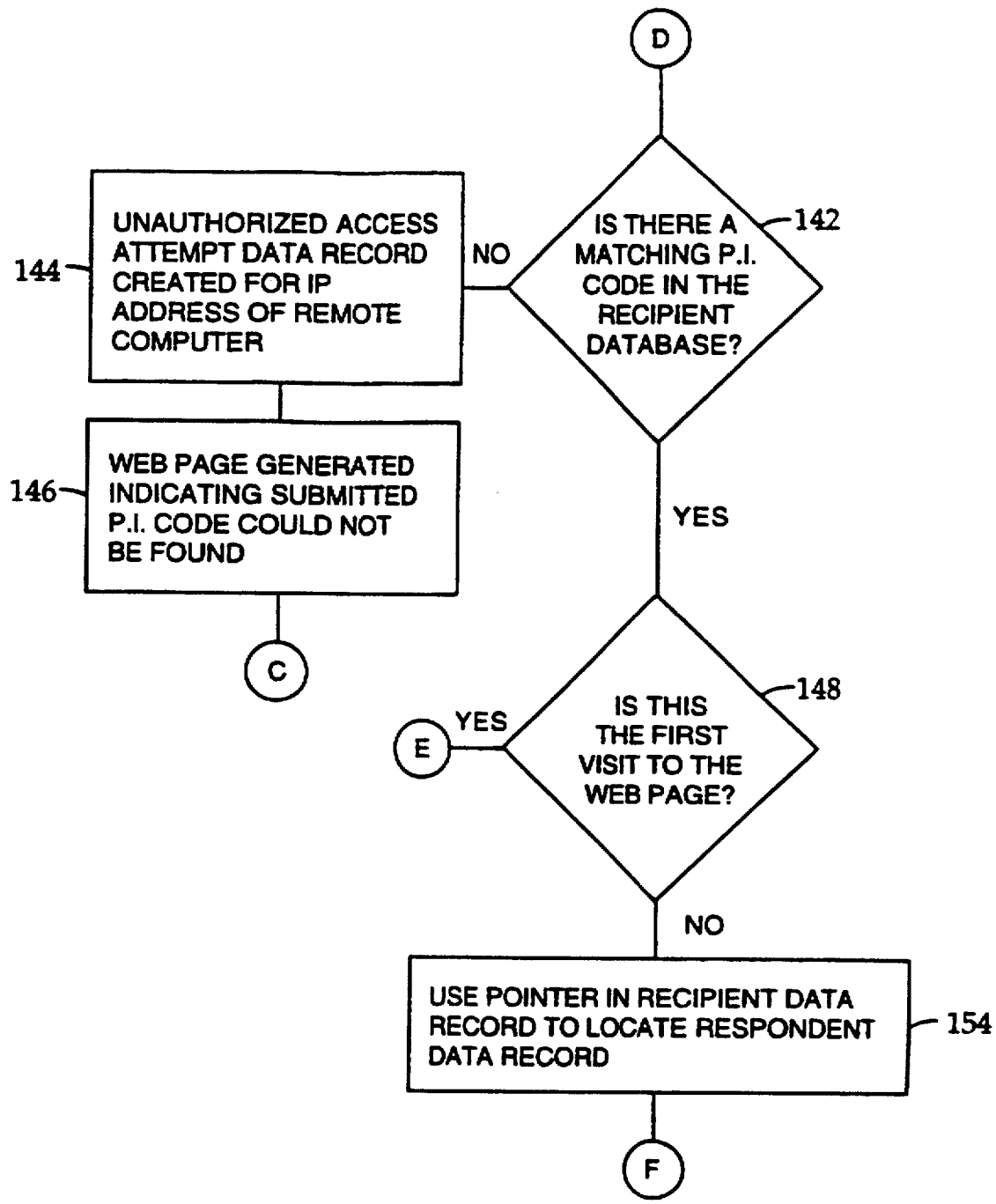
Figure 4E:
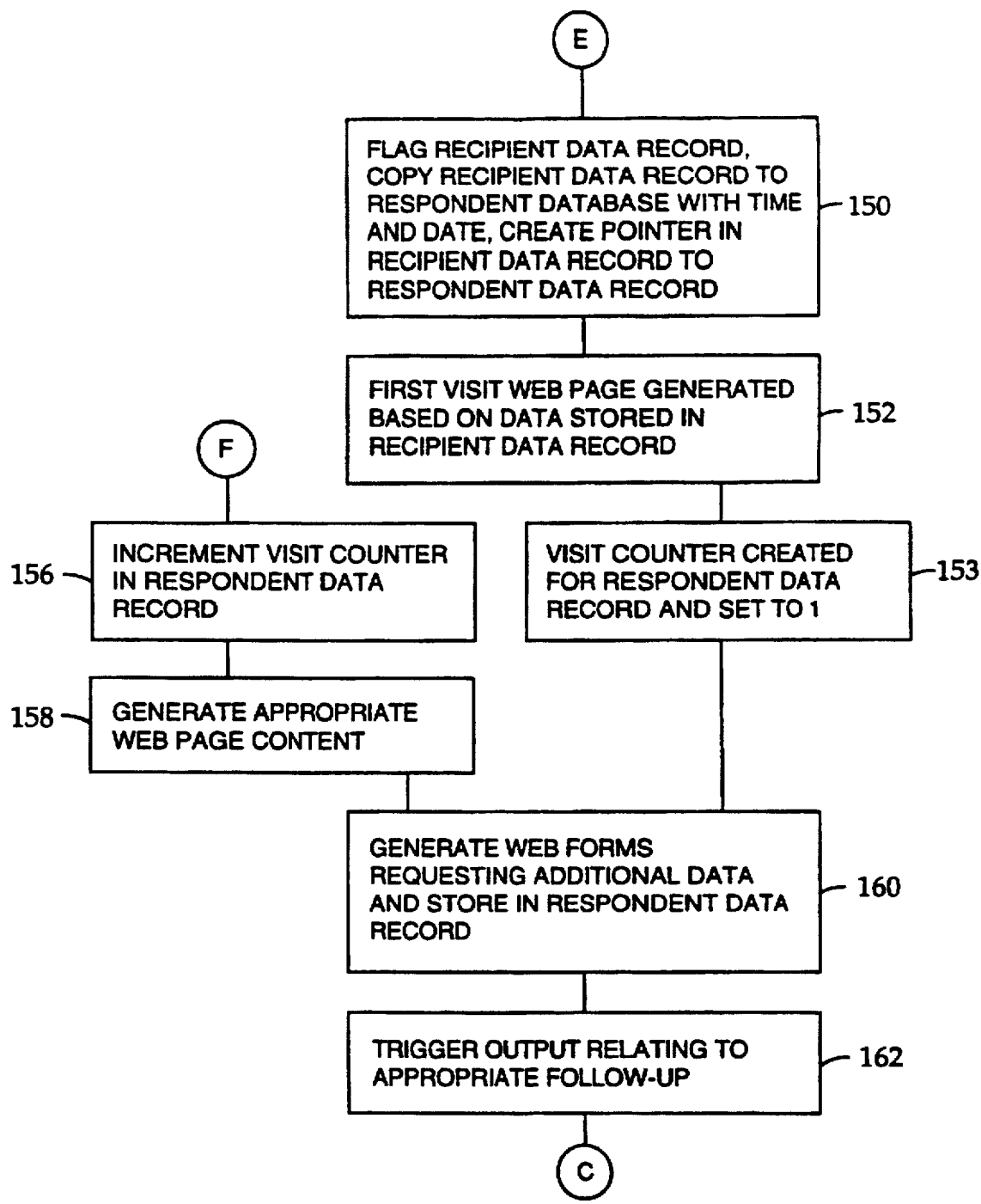

FIG. 3 displays a web page 60 generated by the web page creation means 40 of the web server computer 16, when the uniform resource locator 54 (as displayed in FIG. 2) is entered into web browser 34. Typically, web page 60 will be linked to additional web pages containing more information. Web page 60 may be similar to a standard form letter into which certain pieces of data, such as the responding recipient's name 62, have been inserted through known merging techniques, and yet will often include the interactive elements such as forms to fill in and options to select that standard web pages offer. However, more elaborate web page creation programs may be devised for generating even more unique web pages 60.

Web page creation means 40 is preferably a common gateway interface (CGI) script program or application program interface (API) which produces dynamic web pages, using hypertext markup language (HTML), generated through commonly known techniques. Unlike a static web page which is written once, stored as a data file at a location accessible by the web server computer, and delivered unchanged when the page's URL has been requested, a dynamic page is delivered by a CGI script program which creates the page as required. The content of a dynamic page can vary, depending upon the time that it is requested, current conditions at the web server computer site or data supplied by the user in a web-form that then calls the CGI script to action it. CGI defines how information should be passed between a browser and a web server, and how the server can then deliver content back again as a result of this interaction. CGI scripts can be written in almost any programming language.

Typically, web server 16 computer will be configured with one (or more) of its directories being designated as a CGI script directory. When web server computer 16 receives a request for a URL in a CGI directory, it assumes that it is a CGI script program that must be executed, rather than an HTML document that should simply be served back to the browser. A typical URL might look something like: www.abc.com/myproject/mypage.htm. Entering this URL into a web browser would trigger a request for the document mypage.htm in the directory myproject on the web server computer www.abc.com.

However, in web server computer 16 of the current invention, the root or main directory is configured to be a CGI script directory so that a URL request for www.abc.com/myproject/123-456-789-246 would actually execute the CGI script myproject on the web server computer 16 identified as www.abc.com. The CGI script myproject then examines the remaining path information which contains: /123-456-789-246. Removing the leading forward slash reveals the unique personal identification code 56. Once determined, the personal identification code 56 can be used to retrieve the corresponding recipient data from the recipient database 12.

FIG. 4 illustrates the steps of the method 100 carried out by apparatus 10 made in accordance with the subject invention. An advertiser obtains one or more mailing lists from a list broker, which are sent to a data house, along with any in-house lists and suppression lists that the advertiser has previously generated (Block 102). The data contained on the mailing and in-house lists is processed to eliminate duplicates and to prevent mail from being sent to certain individuals or addresses on the suppression lists which the advertiser has previously determined would be inappropriate, to generate a recipient database 12 (Block 104). In a typical direct mailing, the direct mail pieces 26 would then be printed by merging a pre-prepared form letter with data from the mailing lists, and the direct mail pieces 26 would be prepared for mailing and deposited with the post office 28.

In accordance with the method of the present invention, for each intended recipient in the recipient database 12, a unique personal identification code is generated and stored in the correlated recipient data record 22 (Block 106). The direct mail pieces 26 are then printed by merging a previously prepared form letter with data from the mailing lists, so that each displays the name, address and uniform resource locator containing the unique personal identification code of one recipient (Block 108). The direct mail pieces 26 are then prepared for mailing and deposited with the post office 28 (Block 110). The recipient database is then copied onto, or otherwise made accessible to, the web server computer 16 (Block 112). In the meantime, the advertiser or service bureau has developed one or more CGI script programs capable of producing appropriately personalized web pages and related web pages or forms on demand (Block 114).

Once properly configured, the web server computer 16 waits for URL requests from the Internet (Block 116). Once a uniform resource locator 54 specifying the web server computer's 16 Internet address is entered into a remote computer's 20 web browser 34, the access software 32 of the web server computer 16 receives the URL request (Block 118).

The access software 32 then determines if the uniform resource locator 54 contains a valid CGI script program name correlated to one of the CGI script programs developed in Block 114 (Block 120). If the uniform resource locator does not contain a valid CGI script program name, the web page creator 40 optionally generates and submits a new or previously stored web page to the web browser 34 of the remote computer 20, which states that access to the web server computer 16 requires a complete URL (Block 122). The system then returns to the waiting stage of Block 116. If the uniform resource locator 54 does contains a valid CGI script program name, then the corresponding CGI script program is run (Block 124).

The access software 32 then accesses the unauthorized access attempts data 48 stored in the unauthorized access attempts database 46 to determine if an excessive amount of invalid personal identification codes have been submitted within a pre-determined period of time (Block 126). If this test is positive, the web page creator 40 optionally generates and submits a new or previously stored web page to the web browser 34 of the remote computer 20, which states that access to the personalized web page service is temporarily unavailable (Block 128). The system then returns to the waiting stage of Block 116. If this test is negative, the web server computer 16 retrieves the Internet protocol address of the remote computer 20 requesting information (Block 130).

The access software 32 then accesses the unauthorized access attempts data records 48 correlated to the Internet protocol address (retrieved in Block 130) to determine if an excessive amount of invalid personal identification codes have been submitted within a predetermined period of time by the remote computer 20 (Block 132). If this test is positive, the web page creator 40 optionally generates and submits a new or previously stored web page to the web browser 34 of the remote computer 20, which states that access to the personalized web page service is temporarily unavailable (Block 134). The system then returns to the waiting stage of Block 116. If this test is negative, the access software 32 extracts the personal identification code 56 from the uniform resource locator 54 entered into the web browser 34 of the remote computer 20 (Block 136).

The access software 32 then determines whether the personal identification code has been correctly formatted (Block 138). If this test is negative, the web page creator 40 optionally generates and submits a new or previously stored web form to the web browser 34 of the remote computer 20, which requests that the personal identification code 56 be re-entered (Block 140). Once a new personal identification code 56 has been reentered, the system 100 returns to Block 138.

If a correctly formatted personal identification code 56 has been entered, the access software 32 then checks the recipient data records 22 to determine if there is a correlated recipient data record 22 containing a matching personal identification code 56 (Block 142). If no match is found, the web server computer 16 creates an unauthorized access attempts data record 48 containing the Internet protocol address of the remote computer 20 (Block 144). The web page creator 40 then submits a new or previously stored web page stating that the submitted personal identification code could not be found and to try again (Block 146). The system 100 then returns to Block 116.

If a matching personal identification code 56 is located within the recipient data records 22, the access software 32 searches the located recipient data record 22 to determine if the recipient data record 22 has been flagged as a respondent (Block 148). If the recipient data record 22 has not been flagged as a respondent, this indicates that this is the first time that the responding recipient has accessed the personalized web page. The web server computer 16 accordingly preferably flags the relevant recipient data record 22 as a respondent, copies the correlated recipient data record 22 to the respondent database 42 in conjunction with data correlated to the time and date of the visit, and adds a pointer in the recipient data record 22 to the corresponding new respondent data record 44 (Block 150). The web page creator 40 then generates an appropriate personalized first visit web page 26 (Block 152). A visit counter is created and stored in the new respondent data record 44, which is set to equal 1 (Block 153).

If the recipient data record 22 is flagged as a respondent, the web server computer 16 preferably uses the pointer in the recipient data record 22 to find the correlated respondent data record 44 (Block 154). The web server computer 16 then increments and stores the visit counter in the respondent data record 44 (Block 156). The web page creator 40 then generates an appropriate web page (Block 158). Preferably, such a web page would be different from the web page displayed during the respondent's last visit.

During the respondent's visit to the personalized web page, the web server computer 16 may request additional information from the respondent or allow the respondent to modify the existing respondent data by inputting information in accordance with the CGI script program. This new or modified data is stored in the correlated respondent data record 44, and is preferably used to affect the web page content in future visits (Block 160). Finally, upon completion of the respondent's visit to the personalized web page, output should be generated by the web server computer 16 to indicate to the advertiser whether any additional follow-up actions such as e-mail, telephone calls, or mail are warranted (Block 162). The system 100 then returns to Block 116. It should be understood that the advertiser may access the data stored in the respondent database 42 at any time, although the advertiser will probably only do so once a sufficient number of respondent data records 44 have been generated.

While one aspect of the subject invention has been illustrated and described as involving direct mail pieces comprising printed materials assigned postal addresses and sent through standard postal delivery systems (such as through the post office or by courier), it should be understood that with simple and obvious modifications, any form of targeted one-to-one communication may be used in the system or method of the claimed invention. Accordingly, the direct mail pieces may comprise electronic data files provided with e-mail addresses and sent by e-mail. Alternatively, the direct mail pieces may comprise faxes sent by facsimile transmission to specified phone numbers.

Thus, while what is shown and described herein constitutes preferred embodiments of the subject invention, it should be understood that various changes can be made without departing from the subject invention, the scope of which is defined in the appended claims.

I claim:

1. A system for creating a personalized computer user interface for a communications network in connection with a direct marketing program, comprising:

(a) database means for storing a plurality of recipient data records each comprising recipient addressing information, and a unique personal identification code for each of a plurality of recipients;

(b) distribution means for distributing to each of the recipients an electronic return address containing the unique personal identification code;

(c) computer server means operationally coupled to the communications network for serving a plurality of remote computers, including access means for allowing a responding recipient to access the computer server means by entering the electronic return address into the remote computer;

(d) retrieval means coupled to the computer server means and database means for retrieving recipient data from the database means correlated to the personal identification code contained in the electronic return address; and (e) user interface creation means operationally coupled to the retrieval means and the database means for creating a unique interactive user interface based upon the recipient data and communicating the user interface to the remote computer.

2. The system as defined in claim 1, wherein the communications network comprises the Internet, the computer server means comprises a web server computer, the remote computer includes a web browser, the electronic return address comprises a uniform resource locator, and the user interface creation means creates a web page.

3. The system as defined in claim 1, wherein the personal addressing information comprises a name and a recipient address for each recipient.

4. The system as defined in claim 3, wherein the personal addressing information also comprises demographic and tracking information.

5. A system for providing an interactive response to a direct mail marketing program, comprising:

(a) recipient database means for storing recipient data records relating to each of a plurality of recipients, wherein each recipient data record comprises a name, recipient address, and unique personal identification code for one of the recipients;

(b) mail generating means coupled to the database means for generating a multiplicity of direct mail pieces each displaying the name, address, and a uniform resource locator containing the personal identification code for one recipient; and (c) web server means operationally connected to the Internet for serving a plurality of remote computers each having web browser means for browsing the Internet, comprising access means for enabling a responding recipient to access the web server means by entering the uniform resource locator displayed on the direct mail piece received by the responding recipient into a web browser means;

(d) retrieval means coupled to the web server means and recipient database means for retrieving recipient data from the recipient database means correlated to the personal identification code contained in the uniform resource locator; and (e) web page creation means coupled to the web server means and retrieval means for creating a unique interactive web page based upon the recipient data, and downloading the interactive web page to the web browser means.

6. The system as defined in claim 5, wherein the recipient database means comprises a first database primarily accessed by the web server means and a second database primarily accessed by the mail generating means, and wherein the data stored in the second database is correlated to the data stored in the first database.

7. The system as defined in claim 5, wherein the direct mail pieces comprise printed matter, and wherein the recipient address comprises a postal address.

8. The system as defined in claim 5, wherein the direct mail pieces comprise electronic mail, and wherein the recipient address comprises an e-mail address.

9. The system as defined in claim 5, wherein the direct mail pieces comprise faxes, and wherein the recipient address comprises a telephone number.

10. The system as defined in claim 5, wherein the web server means also comprises respondent database creation means for creating a respondent database, wherein the respondent database includes data correlated to the recipient data record for each responding recipient.

11. The system as defined in claim 10, wherein the respondent database creation means comprises output means for outputting data from the respondent database.

12. The system as defined in claim 10, wherein the recipient database creation means includes modification means accessible by the respondent for modifying the recipient data record.

13. The system as defined in claim 5, wherein the remote computer has an Internet protocol address, and wherein the web server means comprises remote computer address determining means for determining the Internet protocol address of the remote computer.

14. The system as defined in claim 13, wherein the web server means also comprises detection means for detecting unauthorized access attempts to generate personalized web pages, comprising:

(a) means for capturing the personal identification code of the entered uniform resource locator;

(b) means for comparing the captured personal identification code to the plurality of personal identification codes stored in the recipient database means and determining if a match is found; and (c) means for terminating access to the web server computer by the remote computer in the event that no match is found.

15. The system as defined in claim 14, wherein the web server means comprises access database generating means for generating and storing an unauthorized access attempts database comprising unauthorized access attempts data records containing data correlated with Internet protocol addresses of remote computers from which a uniform resource locator containing a non-matching personal identification code has been entered.

16. The system as defined in claim 15, wherein the web server means comprises time tracking means for tracking current time, and wherein the access database generating means is coupled to the time tracking means and comprises means for associating data correlated to the time of an unauthorized access attempt with the Internet protocol address of the remote computer from which an unauthorized access attempt was made.

17. The system as defined in claim 16, wherein the access database generating means comprises means for determining the number of unauthorized access attempts associated with an Internet protocol address within a determined period of time.

18. The system as defined in claim 17, wherein the access means is coupled to the unauthorized attempts access database for denying access to a remote computer having an Internet protocol address for which more than a specified number of unauthorized access attempts have been recorded within a determined period of time.

19. The system as defined in claim 18, wherein the access database generating means comprises means for determining the total number of unauthorized access attempts within a determined period of time.

20. The system as defined in claim 19, wherein the access means is coupled to the access generating database means for denying access to the web server when more than a determined number of unauthorized access attempts have been recorded within a determined period of time.

21. A method for increasing response to direct marketing, comprising the following steps:

(a) creating a recipient database containing a plurality of recipient data records each comprising a name, an address and a unique personal identification code;

(b) providing each of a plurality of recipients with a uniform resource locator containing a unique personal identification code;

(c) providing a plurality of remote computers, each having a web browser operable by one of the recipients, with access to a web server computer operationally coupled to the Internet;

(d) receiving a uniform resource locator entered by a responding recipient into the web browser;

(e) extracting the personal identification code contained in the uniform resource locator entered by the responding recipient;

(f) retrieving recipient data from the recipient database correlated to the personal identification code; and (g) generating and downloading to the web browser a personalized web page based on the recipient data.

22. The method described in claim 21, comprising the step of comparing the personal identification code extracted from the uniform resource locator entered by the responding recipient, with the data stored in the recipient database to determine if the personal identification code is valid.

23. The method described in claim 22, comprising the step of denying further access to the web server computer in the event that the personal identification code is not valid.

24. The method described in claim 23, comprising the step of flagging the recipient data record for each responding recipient, and creating a respondent database comprising respondent data records containing data correlated to the flagged recipient data records.

25. The method described in claim 24, comprising the step of storing data associated with the time and date that the web server receives the request for access with the correlated respondent data record.

26. The method described in claim 21, comprising the step of determining the Internet protocol address of the remote computer.

* * * * *